(12) United States Patent
Teetzel et al.

(10) Patent No.: US 8,661,571 B1
(45) Date of Patent: Mar. 4, 2014

(54) HELMET MOUNTING SYSTEMS

(75) Inventors: James W. Teetzel, York, ME (US); Gary M. Lemire, Lee, NH (US)

(73) Assignee: Wilcox Industries Corp., Newington, NH (US)

( * ) Notice: Subject to any disclaimer, the term of this patent is extended or adjusted under 35 U.S.C. 154(b) by 922 days.

(21) Appl. No.: 12/117,704

(22) Filed: May 8, 2008

Related U.S. Application Data (60) Continuation-in-part of application No. 11/804,813, filed on May 21, 2007, which is a division of application No. 10/959,906, filed on Oct. 6, 2004, now Pat. No. 7,219,370.

(60) Provisional application No. 60/928,239, filed on May 8, 2007, provisional application No. 60/509,136, filed on Oct. 6, 2003.

(51) Int. Cl.
*A42B 1/24* (2006.01)

(52) U.S. Cl.
USPC ............................................................. 2/422

(58) Field of Classification Search
USPC ............... 24/580.1, 590.1, DIG. 53, DIG. 60, 24/265 CD, 265 R; 403/348, 350, 353
See application file for complete search history.

(56) References Cited

U.S. PATENT DOCUMENTS

| | | | |
|---|---|---|---|
| 2,736,272 A * | 2/1956 | Elsner | 410/105 |
| 3,548,410 A * | 12/1970 | Parker | 2/424 |
| 4,242,757 A * | 1/1981 | Nava | 2/10 |
| 4,449,787 A | 5/1984 | Burbo et al. | |
| 4,660,943 A * | 4/1987 | Ellis | 359/362 |
| 4,689,834 A * | 9/1987 | McCarthy et al. | 2/6.2 |
| 4,901,210 A | 2/1990 | Hanabusa | |
| 4,987,608 A * | 1/1991 | Cobb | 2/6.2 |
| 5,416,922 A * | 5/1995 | Horvat et al. | 2/6.2 |
| 5,456,095 A * | 10/1995 | Tawil et al. | 63/29.1 |
| 5,467,479 A | 11/1995 | Mattes | |
| 5,471,678 A | 12/1995 | Dor | |
| 5,506,730 A | 4/1996 | Morley et al. | |
| 5,535,053 A | 7/1996 | Baril et al. | |
| 5,542,627 A * | 8/1996 | Crenshaw et al. | 244/121 |
| 5,581,821 A * | 12/1996 | Nakano | 2/422 |
| 5,604,958 A * | 2/1997 | Anscher | 24/3.1 |
| 5,703,354 A | 12/1997 | Wannagot et al. | |
| 5,898,472 A * | 4/1999 | Oshikawa | 351/156 |
| 5,914,816 A | 6/1999 | Soto et al. | |

(Continued)

FOREIGN PATENT DOCUMENTS

FR      2677604 A1      12/1991

OTHER PUBLICATIONS

U.S. Appl. No. 12/259,010, filed Oct. 27, 2010.
U.S. Appl. No. 12/759,435, filed Apr. 13, 2010.

(Continued)

*Primary Examiner* — Khoa Huynh
*Assistant Examiner* — Anna Kinsaul
(74) *Attorney, Agent, or Firm* — McLane, Graf, Raulerson & Middleton, Professional Association (57) ABSTRACT

Pivoting helmet mounts for an optical device are provided. In one aspect, a bayonet mount is provided for removably attaching a bayonet mounting base to a flush-mounting bracket on the helmet. Optionally, a lanyard for securing the optical device to the helmet is provided. In further aspects, the bayonet mount is omitted and the helmet mount is secured directly to the flush mount bracket.

15 Claims, 7 Drawing Sheets

(56) References Cited

U.S. PATENT DOCUMENTS

| | | |
|---|---|---|
| 6,457,179 B1 * | 10/2002 | Prendergast ...................... 2/6.2 |
| 6,472,776 B1 | 10/2002 | Soto et al. |
| 6,560,029 B1 | 5/2003 | Dobbie et al. |
| 6,662,370 B1 | 12/2003 | Buchanan, Jr. |
| 7,219,370 B1 * | 5/2007 | Teetzel et al. ...................... 2/6.2 |
| 7,255,436 B2 * | 8/2007 | Tracy ............................ 351/155 |
| 2007/0214551 A1 | 9/2007 | Teetzel et al. |

OTHER PUBLICATIONS

U.S. Appl. No. 12/791,063, filed Jun. 1, 2010.

* cited by examiner

HELMET MOUNTING SYSTEMS

CROSS-REFERENCE TO RELATED APPLICATIONS

This application claims the priority benefit under 35 U.S.C. §119(e) of U.S. provisional patent application No. 60/928,239 filed May 8, 2007.

This application also claims priority, as a continuation-in-part type application, under 35 U.S.C. §120 to U.S. patent application Ser. No. 11/804,813, May 21, 2007, now pending, which is a divisional application of U.S. patent application Ser. No. 10/959,906 filed Oct. 6, 2004, now U.S. Pat. No. 7,129,370, which is a nonprovisional application of U.S. provisional patent application Ser. No. 60/509,136 filed Oct. 6, 2003.

Each of the aforementioned applications is incorporated herein by reference in its entirety.

BACKGROUND

The present disclosure relates to improved systems for mounting an optical device, such as a night vision goggle, to a field helmet.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE PREFERRED EMBODIMENTS

Referring now to the drawings, wherein like reference numerals refer to like or analogous components throughout the several views, and with particular reference to FIGS. 1-4C, there appears a first exemplary helmet mounting system embodiment 600. The helmet mounting system 600 is removably attached at a first end to a bracket 604 and at a second end to an optical device 116. The present invention is shown with an monocular night vision goggle, e.g., employing a single image intensifier tube and associated optics, for ease of exposition, however, it will be understood that the invention can be used with other types of sighting devices, such as a monocular or binoculars, helmet mounted display screens, head-up display or any other helmet mounted optical, electro-optical, and/or viewing devices.

Figure 1:
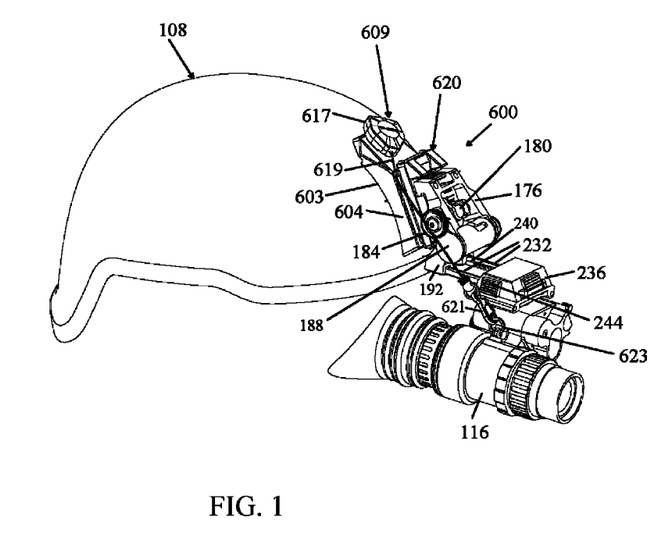
FIG. 1 is an isometric view taken from the front and side of a helmet carrying an optical device using a helmet mount system according to a first exemplary embodiment.
Figure 2:
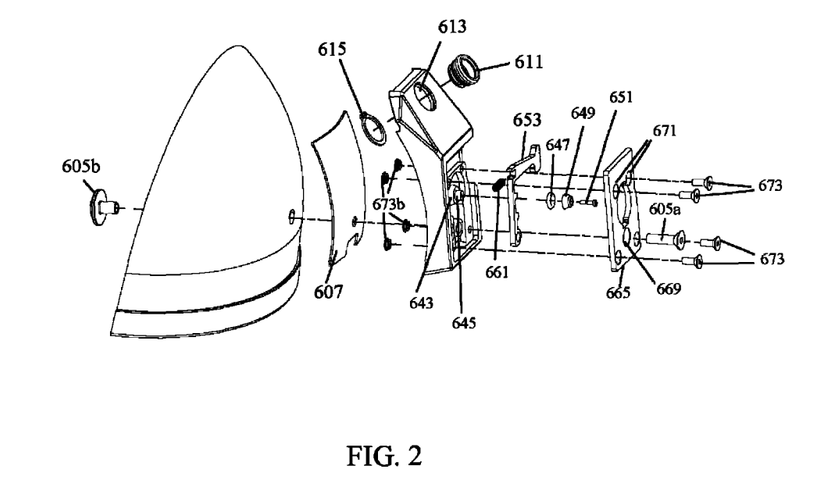
FIGS. 2 and 3 are exploded and partially exploded views, respectively, of the mounting base appearing in FIG. 1.
Figure 3:
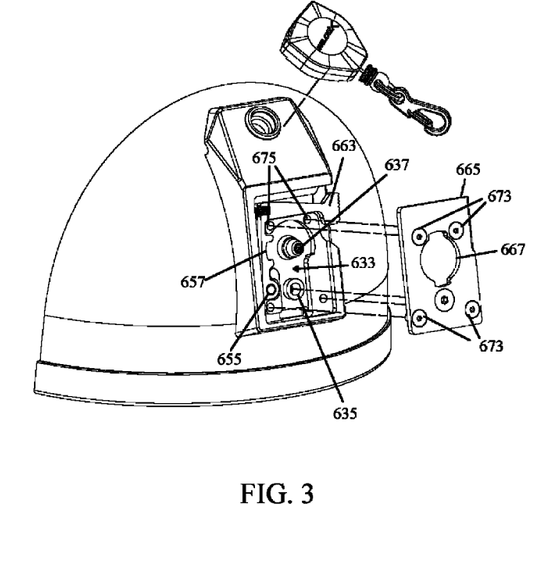

The bracket 604 is attached to the front portion of a helmet 108. The exemplary bracket 604 is flush-mounted to the helmet 108 to reduce the tendency of the bracket to snag as compared to mounting systems employing a bracket which is offset from the exterior surface of the helmet. For purposes of this application, "flush" means that the helmet-contacting peripheral edge 603 of the bracket 604 is substantially continuous or gap-free. Thus, the system 600 may advantageously be employed by parachutists or in environments wherein the mounting system may be subject to snagging. The bracket 604 may be formed of a molded plastic or other material. The bracket 604 is secured to the helmet 108 via mating threaded fasteners 605a and 605b. A pad 607 formed of rubber or other non-slip or slip-resistant material may be provided between the bracket 604 and the helmet 108 to provide increased frictional engagement between the flush mount bracket 604 and the surface of helmet 108, e.g., to prevent rotational slippage of the bracket 604.

The bracket 604 includes a recess or cavity 633 having an upstanding boss 635 for receiving the fastener 605a and a tapered guide post assembly 637 for mating with an aligned opening 641 formed on male bayonet member 639. The tapered guidepost assembly 637 includes a base 643 having an upstanding boss 645 thereon. A compression O-ring 647 is received about the boss 645 and is trapped between the base 643 and a guidepost insert 649. A threaded fastener 651 rotatably engages the boss 645 to secure the insert 649 to the base 643.

Figure 4A:
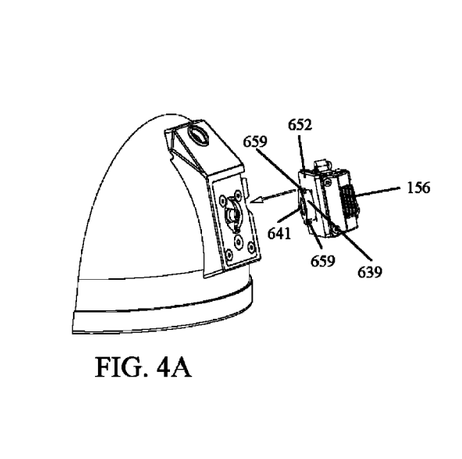
FIGS. 4A, 4B, and 4C are isometric views illustrating the manner of attachment of the bayonet breakaway base to the helmet mounting base.
Figure 4B:
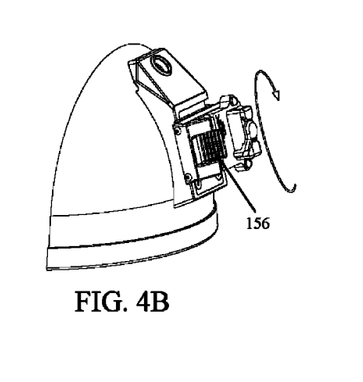
Figure 4C:
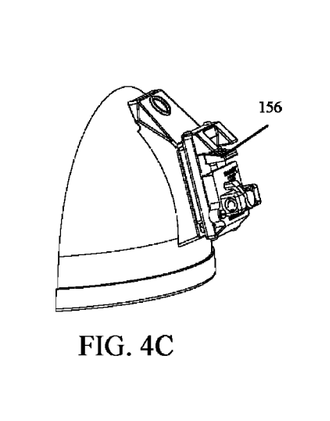

A bayonet mount base 620 includes the male bayonet member 639 on the rearward facing surface thereof. The male bayonet member 639 may be a breakaway mount base and may incorporate a breakaway mechanism which provides an interface between a pivot arm assembly 176 and a breakaway base 620. The breakaway mechanism described in the aforementioned commonly owned U.S. Pat. No. 7,219,370 incorporated herein by reference. As best seen in FIGS. 4A-4C, in operation, the male bayonet member 639 is aligned with and inserted into the opening 667. The bayonet mount base 620 is then rotated 90 degrees until one of the ears 659 is aligned and received within the recess 657. To remove the mount base 620 from the bracket 604, the lever arm 663 is depressed and the process is reversed.

A bayonet lock 653 is pivotally received within the cavity 633 and pivots about a pivot post 655. The bayonet lock 653 includes a profile defining a recess 657 sized to receive and engage one of the male bayonet ears 659 formed on the male bayonet member 639 when the male bayonet member is in the secured and locked position. A spring 661 urges the bayonet lock toward the locked position. Depressing a lever arm 663 against the urging of the spring 661 disengages the recess 657 from the bayonet ear 659, allowing removal of the bayonet member 639. A female bayonet plate 665 includes a keyed opening 667 adapted to receive the male bayonet member 639 therethrough and a corresponding aligned opening 669 for receiving the threaded fastener 605a. Openings 671 receive threaded fasteners 673a for engaging aligned openings 675 in the base of the cavity 633 and fasteners 673b for securing the bayonet plate 665 thereover.

The pivot arm assembly 176 is secured to the breakaway base 620 in breakaway fashion. The connection between the breakaway assembly 620 and the pivot arm assembly 176 may be selectively configured as a breakaway connection or a rigid attachment by moving lever 180. Breakaway base 620 includes a housing member (not shown) and a cam (not shown), which is manually rotatable via lever 180. When lever 180 is in a non-breakaway position the cam member has been rotated to a locked position to secure the pivot arm assembly 176 to the breakaway base 620. When the cam member has been rotated to an unlocked position the pivot arm assembly 176 can be separated from the breakaway base 620 with the application of a sufficient force. The breakaway setting is advantageous in that it may prevent injury to the wearer in the event the wearer becomes entangled or the optical device 116 impacts a foreign object. Likewise, the non-breakaway setting may advantageously be selected in instances where it is desired to prevent inadvertent dislodging of the optical device 116 from the helmet, e.g., where loss of the optical device 116 is possible or where the wearer may be subject to high accelerational or G forces. The breakaway connector may be of a type described in commonly owned U.S. Pat. No. 7,219,370.

A pivot arm 192 is pivotally attached to the pivot arm assembly 176 for pivotally moving the optical device 116 between an operational position in front of the user's eyes (see FIG. 1) and a stowed position out of the user's line of vision. Slide rails 232 on the pivot arm 192 provide user-adjustable fore and aft positioning of the optical device 116 via selective positioning of carriage member 236. When optical device 116 is in an operational position, the slide rails 232 extend out horizontally from pivot arm 192. Unless otherwise indicated, all directional or positional terms used herein, such as "horizontal," "vertical," "front," "rear," etc., and variations thereof refer to a direction or orientation relative to the helmet as viewed in FIG. 1 or when worn by a user. When slide rails 232 are in a horizontal position carriage member 236 is movable along the slide rails 232 enabling the user to horizontally position the optical device 116 at a comfortable or desired focal distance from the operator's eyes.

At least one of the slide rails 232 (both in the depicted embodiment) contain a series of locking teeth 240 along its length for engaging an internal locking member (not shown) such as a toothed member, pin, or the like, to provide secure retention at a selected position. Release button 244, biased toward the locked position, may be manually depressed to disengage the locking members to allow sliding movement of the carriage member 236 until the optical device 116 is positioned at a desired focal position in front of the user's eye(s). The carriage member may be of the type detailed in the aforementioned U.S. Pat. No. 7,219,370.

Referring now to FIGS. 4A-4C, the bayonet mount base 620 includes a sliding plate 652, which slides horizontally with respect to the bayonet mount base 620 when actuator button 156 is depressed. In this manner, the optical device 116 is selectively positionable to provide a vertical adjustment of the optical device relative to the eyes of a wearer. The vertical adjustment mechanism may be as described in the aforementioned U.S. Pat. No. 7,219,370. Likewise an angle or tilt adjustment knob 184 may be loosened to allow adjustment of the optics to a desired tilt angle according to user's eye position and a desired line of sight, whereby the desired tilt angle may then be secured in the desired position by tightening the knob 184. The knob 184 includes a threaded rod (not shown) rotatably engaging a mating threaded opening in pivot arm assembly 176. The pivot arm assembly 176 rotates relative to plate 188, which includes an elongated or curvate opening or slot (not shown) for receiving the threaded rod. The angle or tilt adjustment knob may be as described in the aforementioned U.S. Pat. No. 7,219,370.

Figure 5:
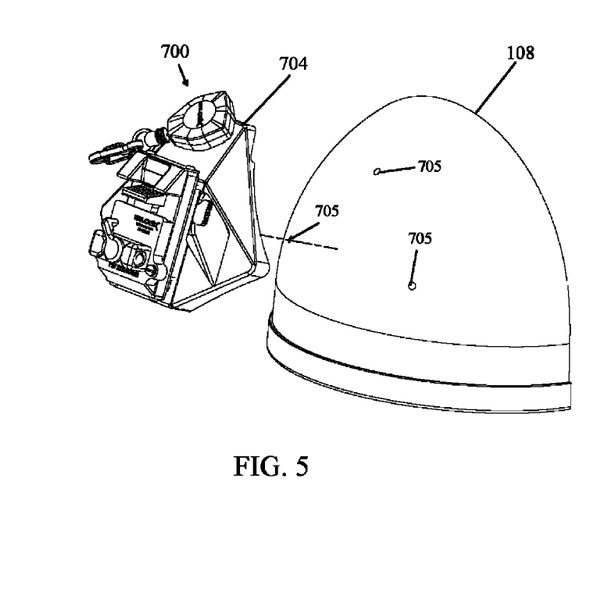
FIG. 5 is an isometric view of a second embodiment mounting assembly.

Referring now to FIG. 5, there appears an alternative helmet mount system embodiment 700, which may be as described above by way of reference to the embodiment 600, except that the bracket 704 is configured to be attached to the helmet 108 via three threaded fasteners (not shown) extending through openings 705 in the helmet and engaging the bracket 704.

Figure 6:
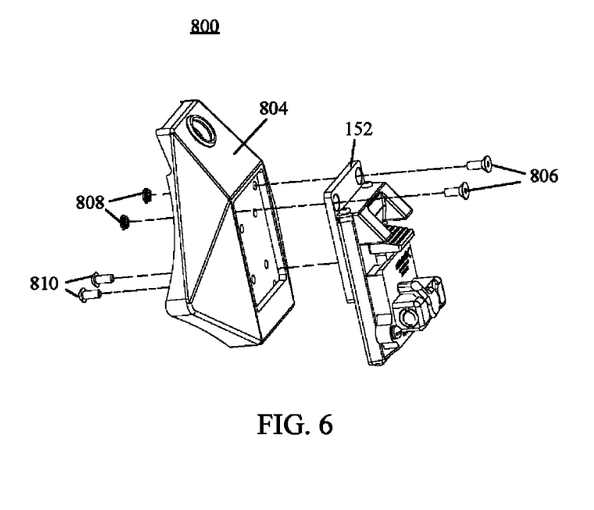
FIG. 6 is an exploded view of a third embodiment mounting assembly.

Referring now to FIG. 6, there is shown another alternative embodiment, which is similar to the embodiment of FIG. 5, but wherein the bayonet mount is omitted and a sliding plate 152 is attached to the bracket 804 via a plurality of threaded fasteners, e.g., 806, 808, and 810. In still another embodiment (not shown), the embodiment of FIGS. 1-4 is modified to eliminate the bayonet interface and wherein the sliding plate 152 is permanently attached to a suitably modified bayonet mount base 620 in the same manner as shown in FIG. 6.

Referring now to FIGS. 1-4C and 7-8, there is shown an optional lanyard 609 which may be secured to the bracket via an optional lanyard interface on the bracket 604. While the lanyard and lanyard interface are optional, the use of a lanyard may be advantageous in preventing damage to the optics 116 in the event it becomes disengaged from the helmet.

Figure 7:
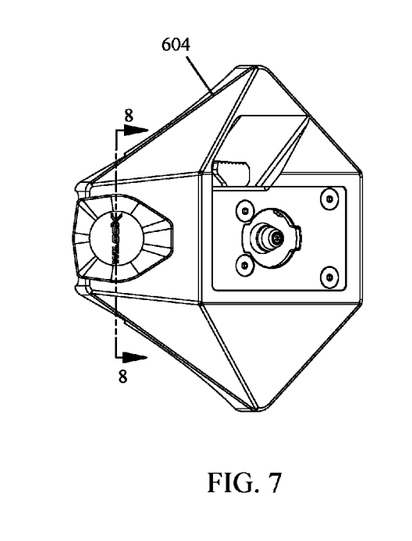
FIG. 7 is an isometric view of the flush mount bracket of FIG. 1 with optional lanyard.
Figure 8:
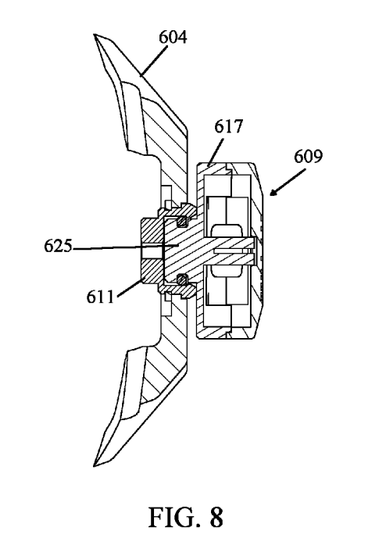
FIG. 8 is a cross-sectional view taken along the lines 8-8 in FIG. 7.

In the exemplary illustrated embodiments of FIGS. 1-4C and FIGS. 7 and 8, the lanyard interface includes a lanyard interface ring 611 (female lanyard interface member) received through an opening 613 in the bracket 604 and received therein via a retainer ring 615. The lanyard 609 includes a housing 617 having a retractable cord or strap 619. The free end of the cord 619 has a clip or similar fastener 621 for engaging a loop 623, which may be formed on or secured to the optical device 116. The housing 617 includes a male lanyard interface member 625 rotatably and removably engaging the ring 611. While an exemplary lanyard fastening system is illustrated in FIGS. 7 and 8, it will be recognized that other types of snap fit or quick connect and disconnect fasteners may be employed as well.

The invention has been described with reference to the preferred embodiments. Modifications and alterations will occur to others upon a reading and understanding of the preceding detailed description. Therefore, it is not desired to limit the invention to the specific examples disclosed or the exact construction and operation shown and described. Rather, all suitable modifications and equivalents may be resorted to, falling within the scope of the invention.

Having thus described the preferred embodiments, the invention is now claimed to be:

1. A helmet mount for an optical device, comprising:
   a mounting bracket for attaching said helmet mount to a front portion of a helmet;
   a mounting base intermediate said mounting bracket and a pivot arm assembly, said mounting base removably and vertically slidably attachable to said bracket for adjusting a vertical position of the optical device relative to a user's eyes;
   said pivot arm assembly having a pivot arm coupled to said mounting base and one or more slide rails pivotally coupled to said pivot arm;
   said one or more slide rails pivotal between a first, operational position for positioning the optical device in front of the user's eyes and a second, stowed position for positioning the optical device above the user's line of sight;
   said one or more slide rails extending generally horizontally when the pivot arm is in said first, operational position;
   a carriage member slidable along said one or more slide rails and adapted to carry the optical device, said carriage member for adjusting a horizontal position of the optical device in front of the user's eyes;
   a lanyard assembly secured to said mounting bracket, said lanyard assembly including a lanyard housing, a retractable cord having an attached end secured inside said lanyard housing and a free end, a fastener on said free end for removably connecting the retractable cord to the optical device, and a cord retraction mechanism for storing said retractable cord inside said housing when not in use;

said lanyard assembly including a female lanyard interface member received within an opening defined in said mounting bracket and defining a cavity; and said lanyard housing including a male lanyard interface member removably and rotatably received within the cavity defined by the female lanyard interface member;

where the female lanyard interface member is a separately formed piece and the male lanyard interface and female lanyard interface members have a snap fit connection.

2. The helmet mount of claim 1, wherein said mounting bracket comprises:
 a female bayonet plate having a keyed opening for receiving a complimentary male bayonet member on said mounting base;
 a guide post within said keyed opening for removably engaging a complimentary opening in said male bayonet member; and
 a lock for releasably locking said mounting base to said mounting bracket.

3. The helmet mount of claim 2, further comprising:
 a threaded fastener for securing said mounting bracket to said helmet; and
 a mounting boss on said mounting bracket for receiving said threaded fastener.

4. The helmet mount of claim 1, further comprising:
 a friction pad disposed between said mounting bracket and said helmet.

5. The helmet mount of claim 1, wherein said mounting base comprises:
 a male bayonet member on a rearward facing surface of said mounting base for mating with said mounting bracket;
 a sliding plate slidably connected to said mounting base for adjusting the vertical position of the optical device relative to a user's eyes;
 an opening on said male bayonet member for removably receiving a complimentary protrusion on said mounting bracket; and
 a locking mechanism on said mounting base for selectively adjusting the vertical position of said sliding plate relative to said mounting base.

6. The helmet mount of claim 1, further comprising:
 said male lanyard interface member having an annular groove and a ring received within said annular groove, said ring received within said cavity when the male lanyard interface member is received within the cavity defined by the female interface member.

7. The helmet mount of claim 1, wherein the mounting bracket is fastened to the helmet via one or more threaded fasteners.

8. The helmet mount of claim 1, wherein said mounting base is attached to said mounting bracket via one or more threaded fasteners.

9. The helmet mount of claim 1, wherein said pivot arm assembly includes a tilt adjustment knob for adjusting a tilt position of the optical device relative to a user's eyes.

10. The helmet mount of claim 1, further comprising:
 a breakaway connector for securing said pivot arm to said mounting base, said breakaway connector configured to release upon application of a predetermined force.

11. The helmet mount of claim 1, further comprising:
 a connector for securing said mounting base to said pivot arm assembly, said connector selectively configurable between a breakaway configuration and a nonbreakaway configuration.

12. The helmet mount of claim 1, wherein said mounting bracket includes a contacting edge configured to provide a flush-mount attachment to the helmet.

13. The helmet mount of claim 1, further comprising:
 a quick connect and disconnect mechanism for removably attaching said mounting base to said mounting bracket.

14. The helmet mount of claim 13, wherein said quick connect and disconnect mechanism is a bayonet mechanism.

15. A helmet mount for an optical device, comprising:
 a mounting bracket for attaching said helmet mount to a front portion of a helmet;
 a mounting base intermediate said mounting bracket and a pivot arm assembly, said mounting base attached to said bracket for adjusting a vertical position of the optical device relative to a user's eyes;
 said pivot arm assembly having a pivot arm coupled to said mounting base and one or more slide rails pivotally coupled to said pivot arm;
 said one or more slide rails pivotal between a first, operational position for positioning the optical device in front of the user's eyes and a second, stowed position for positioning the optical device above the user's line of sight;
 said one or more slide rails extending generally horizontally when the pivot arm is in said first, operational position;
 a carriage member slidable along said one or more slide rails and adapted to carry the optical device, said carriage member for adjusting a horizontal position of the optical device in front of the user's eyes;
 a lanyard assembly secured to said mounting bracket, said lanyard assembly including a lanyard housing, a retractable cord having an attached end secured inside said lanyard housing and a free end, a fastener on said free end for removably connecting the retractable cord to the optical device, and a cord retraction mechanism for storing said retractable cord inside said housing when not in use;
 said lanyard assembly including a female lanyard interface member received within an opening defined in said mounting bracket and defining a cavity; and
 said lanyard housing including a male lanyard interface member removably and rotatably received within the cavity defined by the female lanyard interface member;
 where the female lanyard interface member is a separately formed piece and the male lanyard interface and female lanyard interface members have a snap fit connection.

\* \* \* \* \*